(12) United States Patent
Yamaji et al.

(10) Patent No.: US 7,842,400 B2
(45) Date of Patent: Nov. 30, 2010

(54) SURFACE-TREATED STEEL SHEET AND METHOD FOR MANUFACTURING THE SAME

(75) Inventors: Takafumi Yamaji, Okayama (JP); Reiko Yamaji, legal representative, Okayama (JP); Akira Matsuzaki, Hiroshima (JP); Kazuhisa Okai, Hiroshima (JP); Keiji Yoshida, Tokyo (JP); Masaaki Yamashita, Okayama (JP); Yuichi Fukushima, Tokyo (JP); Toshiyuki Okuma, Tokyo (JP)

(73) Assignee: JFE Steel Corporation (JP)

( * ) Notice: Subject to any disclaimer, the term of this patent is extended or adjusted under 35 U.S.C. 154(b) by 1172 days.

(21) Appl. No.: 10/565,362

(22) PCT Filed: Jul. 28, 2004

(86) PCT No.: PCT/JP2004/011128

§ 371 (c)(1),
(2), (4) Date: Feb. 16, 2006

(87) PCT Pub. No.: WO2005/010235

PCT Pub. Date: Feb. 3, 2005

(65) Prior Publication Data

US 2006/0182988 A1    Aug. 17, 2006

(30) Foreign Application Priority Data

Jul. 29, 2003  (JP) .............................. 2003-203000
Aug. 20, 2003  (JP) .............................. 2003-296801
Aug. 20, 2003  (JP) .............................. 2003-296802

(51) Int. Cl.
*B32B 15/04* (2006.01)
*B32B 15/08* (2006.01)
*B32B 15/18* (2006.01)
*B32B 15/20* (2006.01)

(52) U.S. Cl. ...................... 428/626; 428/653; 428/659; 428/681

(58) Field of Classification Search .................. None
See application file for complete search history.

(56) References Cited

U.S. PATENT DOCUMENTS

| 4,264,378 A | | 4/1981 | Oppen et al. | |
|---|---|---|---|---|
| 4,330,598 A | * | 5/1982 | Lee et al. | ..................... 428/653 |
| 6,562,474 B1 | * | 5/2003 | Yoshimi et al. | .......... 428/472.3 |

FOREIGN PATENT DOCUMENTS

| EP | 0 015 020 A1 | 9/1980 |
|---|---|---|
| JP | 55-131176 A | 10/1980 |
| JP | 60-145383 | 7/1985 |
| JP | 1-92279 A | 4/1989 |
| JP | 1-131281 A | 5/1989 |
| JP | 1-53353 B2 | 11/1989 |
| JP | 4-2672 A | 1/1992 |
| JP | 6-146001 A | 5/1994 |
| JP | 2000-26980 A | 1/2000 |
| JP | 2000-248380 A | 9/2000 |
| JP | 2001-181860 A | 7/2001 |
| JP | 2002-30460 A | 1/2002 |
| JP | 2002-146554 A | 5/2002 |
| JP | 2003 55777 A | 2/2003 |
| JP | 2004183053 A * | 7/2004 |
| WO | WO 00/61835 A1 | 10/2000 |
| WO | 01/42530 | 6/2001 |

* cited by examiner

*Primary Examiner*—Aaron Austin
(74) *Attorney, Agent, or Firm*—DLA Piper LLP (US)

(57) ABSTRACT

The present invention provides a surface treated steel sheet including a steel sheet; a plating layer containing at least one metal selected from the group consisting of zinc and aluminum on a surface of the steel sheet; and a film on the plating layer, the film containing at least one metal selected from the group consisting of Al, Mg, and Zn, a tetravalent vanadium compound, and a phosphoric acid group. This surface treated steel sheet exhibits excellent corrosion resistance and excellent surface appearance without containing hazardous substances, such as hexavalent chromium, in the film.

16 Claims, No Drawings

SURFACE-TREATED STEEL SHEET AND METHOD FOR MANUFACTURING THE SAME

TECHNICAL FIELD

This disclosure relates to a surface treated steel sheet exhibiting excellent corrosion resistance and surface appearance and containing no chromium in a surface treatment film, as well as a method for manufacturing the same. The steel sheet is widely used for automobiles, household electrical appliances, construction materials, and the like.

BACKGROUND ART

Previously, steel sheets produced by disposing metal plating containing zinc or aluminum on surfaces of steel sheets and conducting a chromate treatment have been widely used as steel sheets for automobiles, steel sheets for household electrical appliances, and steel sheets for construction materials. The chromate treatment is a treatment to form a chromate layer by using a treatment solution containing hexavalent chromium as a primary component for the purpose of improving the corrosion resistance (white rust resistance, red rust resistance). However, hexavalent chromium that is a controlled substance to prevent the pollution is used in the chromate treatment. Recently, controls on the use of chromium has been stepped up from the viewpoint of the degree of influence on the environment.

Consequently, the surface treatment is directed to become chromate-free. Particularly in consideration of the influence exerted on a waste water treatment during manufacture of a surface treated steel sheet or operators and users who handle products, an environment-conscious surface treated steel sheet has been required in order that the product contains no substance (in particular, hexavalent chromium) harmful to the environment and the human body. Although $Cr^{3+}$ exerts a smaller influence on the environment and the human body as compared with an effect of $Cr^{6+}$, it is difficult to distinguish $Cr^{6+}$ from $Cr^{3+}$ in a film when these are used commercially in practice. Under these circumstances, demands for a chromate-free film containing no chromium compound and having outstanding performance, e.g., corrosion resistance comparable to the chromate treatment, have been intensified.

In order to meet up the above-described demands, many technologies have been proposed, in which thin films are formed on plating surfaces by methods of immersion, coating, an electrolytic treatment, and the like through the use of solutions containing vanadium compounds as components alternative to hexavalent chromium in the chromate treatment solution which has been used previously.

In particular, a vanadium compound having a valence of five has been noted, the vanadium compound widely known as a rust inhibitor of zinc and aluminum. Since the pentavalent vanadium compound has a noble oxidation-reduction potential and exhibits an oxidative effect, it is believed that the pentavalent vanadium compound forms a passive film on a plating surface and exert an antirust effect as an inhibitor of an anode corrosion reaction in a corrosive environment.

For example, Japanese Unexamined Patent Application Publication No. 1-92279 and Japanese Unexamined Patent Application Publication No. 1-31281 disclose methods in which a treatment is conducted with a paint primarily containing phosphoric acid ions and vanadic acid ions. These methods are intended to use primarily the antirust effect of the pentavalent vanadium compound. However, a large antirust effect is not exerted in practice. In addition, a surface treatment solution containing a vanadium compound and a zirconium compound, a titanium compound, or the like has been proposed in Japanese Unexamined Patent Application Publication No. 2002-30460. In this technology, a film is formed by divalent to tetravalent vanadium compounds prepared by partial reduction of pentavalent vanadium compounds. However, in this case, satisfactory corrosion resistance cannot be achieved since divalent or trivalent compound films having a small corrosion-inhibiting effect are contained simultaneously. Furthermore, when exposed at a humid environment, the film is significantly colored and the appearance is deteriorated.

On the other hand, from the viewpoint of application of the above-described surface treated steel sheet to, for example, construction material, e.g., roofing materials and outside wall materials, or household electrical appliances, e.g., back boards of refrigerators, most of all, a high-Al-containing Al—Zn alloy-plated steel sheet and the like typified by Galvalume (55% Al-1.5% Si-remainder Zn) are used in many cases. The reason therefor is that the Al—Zn alloy-plated steel sheet has beautiful plating appearance and exhibits excellent corrosion resistance and, thereby, it can be used without painting in every application. In these applications, the plated steel sheet is required to exhibit corrosion resistance for the long term and, in addition, it is also required that the plating surface is not discolored by exposure to a humid environment and the like, and the commercial value resulting from the beautiful appearance of the plating surface is maintained for the long term.

Furthermore, when the metal plating containing zinc or aluminum is subjected to working, a plating film is peeled off, and the appearance is deteriorated significantly. Consequently, the surface treated steel sheet may be required to have excellent workability. Since the adhesion to the plating film is indispensable to improve the workability, production of a low solubility film by using an inorganic component is effective in improving the workability. In the application to construction materials, a plated steel sheet is molded by roll forming. Therefore, it is required that the plating is not picked up on a roll (that is, good roll forming property is exhibited). In the application to household electrical appliances, a required property is that the appearance after press molding is not blackened due to sliding over the mold.

However, as shown in, for example, Japanese Examined Patent Application Publication No. 1-53353, Japanese Examined Patent Application Publication No. 4-2672, and Japanese Unexamined Patent Application Publication No. 6-146001, a surface treatment film containing an organic resin and a hexavalent chromium compound is formed on a plating surface to meet up the above-described applications under present circumstances. Therefore, a film containing no chromium, that is, a so-called chromium-free film, has not been achieved.

Against such a background, a technology of combining a vanadium compound and an organic resin has been proposed.

For example, a method for forming a coating containing an organic resin, a thiocarbonyl-containing compound, and a vanadium compound is disclosed in Japanese Unexamined Patent Application Publication No. 2000-248380. In this method, the thiocarbonyl-containing compound exerts an effect of improving the corrosion resistance, but a primary component, that is, pentavalent vanadium compound, does not contribute significantly to the improvement of the corrosion resistance. Furthermore, a treatment with a surface treatment agent containing a specially modified phenol resin, a vanadium compound, and a metallic compound of zirconium, titanium, or the like is disclosed in Japanese Unexamined Patent Application Publication No. 2001-181860. In this technology, the specially modified phenol resin exerts a largest effect on the corrosion resistance, an effect of a metal salt of vanadium, zirconium, or the like is small and, therefore, the corrosion resistance cannot be said satisfactory as compared with that of the chromate treatment film.

As described above, each technology exhibits the corrosion resistance to some extent but exhibits a poor oxidizing power as compared with that of the chromic acid ion. Therefore, the corrosion resistance is not satisfactory as compared with that of the chromate film. If the amount of adhesion is increased to ensure the corrosion resistance, in the case where the film contains the pentavalent vanadium compound, there is a problem in that the appearance after drying takes on a yellow tinge derived from the pentavalent vanadium compound. In addition, when exposed to a humid environment, films of vanadium compounds other than the pentavalent vanadium compound are also colored and, therefore, the appearance quality and the corrosion resistance of the film have not been able to become compatible with each other.

It could therefore be helpful to provide a surface treated steel sheet containing chromium in a film and exhibiting excellent, corrosion resistance and surface appearance, as well as a method for manufacturing the same. Furthermore, a surface treated steel sheet exhibiting excellent workability in addition to the corrosion resistance and the surface appearance, as well as a method for manufacturing the same, is provided.

SUMMARY

We provide a surface treated steel sheet including a Steel sheet; a plating layer containing at least one metal selected from the group consisting of zinc and aluminum on at least one surface of the steel sheet; and a film on the plating layer, the film containing at least one metal selected from the group consisting of Al, Mg, and Zn, a tetravalent vanadium compound, and a phosphoric acid group.

In this surface treated steel sheet, preferably the film is a chromium-free film.

In these surface treated steel sheets, preferably the amount of adhesion of the tetravalent vanadium compound per one surface is 1 to 200 mg/m$^2$ in terms of vanadium.

In each of the above-described surface treated steel sheets, preferably the amount of adhesion of phosphoric acid group per one surface is 5 to 800 mg/m$^2$ in terms of phosphorous.

In each of the above-described surface treated steel sheets, preferably the thickness of the film is 5 μm or less.

In each of the above-described surface treated steel sheets, preferably the film further contains an organic resin, or an organic resin coating layer having a thickness of 0.01 to 5 μm is included on the surface of the film. In both cases, preferably the amount of adhesion of the organic resin per one surface is 0.5 to 5 g/m$^2$.

In these surface treated steel sheets, preferably the organic resin is at least one resin selected from the group consisting of water-soluble organic resins and water-dispersible organic resins.

In each of the above-described surface treated steel sheets, preferably the organic resin is a copolymer resin of styrene (a), (meth)acrylic acid (b), a (meth)acrylic ester (c) including an alkyl chain having the carbon number of 1 to 6, and an olefin (d) capable of copolymerizing with these components (a) to (c). In these surface treated steel sheets, preferably the organic resin has a solid content of styrene (a) of 20 to 60 percent by mass, a solid content of (meth)acrylic acid (b) of 0.5 to 10 percent by mass, and a solid content of (meth)acrylic ester (c) including an alkyl chain having the carbon number of 1 to 6 of 20 to 60 percent by mass relative to 100 percent by mass of solid content of the copolymer resin.

In each of the above-described surface treated steel sheets, preferably the plating is an alloy plating of zinc and aluminum, containing 25 to 75 percent by mass of aluminum.

We also provide a method for manufacturing a surface treated steel sheet, the method including the steps of adhering a treatment solution containing at least one metal selected from the group consisting of Al, Mg, and Zn, a tetravalent vanadium compound, and a phosphoric acid group to a plating layer containing at least one metal selected from the group consisting of zinc and aluminum, the plating layer disposed on at least one surface of a steel sheet and, thereafter, conducting drying at a peak sheet temperature of 60° C. to 250° C.

In this manufacturing method, preferably the treatment solution further contains an organic resin and/or the manufacturing method further includes the steps of adhering a treatment solution containing the organic resin, following the drying step, and conducting drying at a peak sheet temperature of 60° C. to 250° C.

In each of the above-described manufacturing methods, preferably the organic resin is a copolymer of styrene (a), (meth)acrylic acid (b), a (meth)acrylic ester (c) including an alkyl chain having the carbon number of 1 to 6, and an olefin (d) capable of copolymerizing with these components (a) to (c).

In each of the above-described manufacturing methods, preferably the plating is an alloy plating of zinc and aluminum, containing 25 to 75 percent by mass of aluminum.

In addition, we also provide a surface treated steel sheet exhibiting excellent corrosion resistance and film appearance, the surface treated steel sheet characterized in that a surface treatment film containing a vanadium compound having a valence of four, a phosphoric compound, and a compound of at least one metal selected from the group consisting of Al, Mg, and Zn is disposed on a surface of a steel sheet plated with at least one type selected from the group consisting of a zinc based type, an aluminum based type, and an Al—Zn based type.

DETAILED DESCRIPTION

The details of our steel sheets and the reasons for the limitations thereof will be described below.

The steel shed used as a base material is not specifically limited. Preferable examples thereof include a thin steel sheet and a thin steel strip from the viewpoint of the applications thereof. In general, the thicknesses of these steel sheets suitable for use are about 0.1 mm to about 3 mm.

The plating layer is a plating layer containing at least one metal selected from the group consisting of zinc and aluminum. That is, the plating is zinc-containing plating, aluminum-containing plating, or plating containing both zinc and aluminum.

The zinc-containing plating is plating which contains zinc. Examples thereof include Zn plating, Zn—Al plating, Zn—Ni plating, Zn—Co plating, Zn—Fe plating, and Zn—Mg plating. In addition, plating formed from zinc based dispersion plating in which silica, alumina, an organic resin, or the like is dispersed in a plating layer, multilayer plating in which these are laminated, and the like are included.

The aluminum-containing plating is plating which contains aluminum. Examples thereof include Al plating, Al—Zn plating, Al—Mn plating, Al—Mg plating, and Al—Si plating. More specifically, Galvalume (55% Al—Zn alloy plating) is included.

The zinc-aluminum-containing plating is plating which contains zinc and aluminum as indispensable components. Examples thereof include Zn—Al—Mg plating, in addition to Zn—Al plating. More specific examples may include 5% Al—Zn alloy plating, 6% Al-3% Mg—Zn alloy plating, and 11% Al-3% Mg—Zn alloy plating.

Therefore, these three classifications of plating may overlap depending on combinations with each of metals, Al and Zn, or combinations with both metals.

Among the above-described plating, the Al—Zn alloy plating containing 25 to 75 percent by mass of aluminum is preferable since extremely excellent corrosion resistance and surface appearance are exhibited. This is because when the Al—Zn alloy plating has an Al content of 25 percent by mass or more, the corrosion resistance is improved by addition of phosphoric acid. In addition, when the Al content is 75 percent by mass or less, the adhesion of the film is increased, and peeling become resistant to occurrence. It is known that 55% Al—Zn alloy plating is the most representative example thereof. In general, the 55% Al—Zn alloy plating refers to alloy plating containing about 50 to 60 percent by mass of Al. In the following description, "high-Al—Zn plating" refers to Al—Zn alloy plating having the above-described Al content. This type of plating film contains Si at a content of 0.5 percent by mass or more of the amount of Al, and about 1 to 3 percent by mass of Si is contained usually.

All plating layers can be produced by various known plating methods, and the method is not specifically limited. That is, the plating layer can be formed by not only a hot dipping method, but also a hot dipping and alloying method (an alloying treatment conducted after the hot dipping is conducted), an electroplating method, a vapor deposition method, or a combination thereof, on an as needed basis. Furthermore, at least two layers of the same type or different types of plating may be applied to produce multilayer plating.

We conducted research on inorganic compounds which does not cause coloring, exhibits excellent surface appearance, and exhibits excellent corrosion resistance. As a result, it was found that a film appearance problem due to coloring, which had been a problem to be resolved, was able to be overcome by using not a pentavalent vanadium compound heretofore known as a rust inhibitor of zinc and aluminum, but a tetravalent vanadium compound. It was found that particularly excellent corrosion resistance was exhibited by the use in combination with phosphoric acid or a phosphoric acid compound. Furthermore, it was found that addition of Al, Mg, or Zn to the film exerted an effect on reducing coloring of the film appearance, while the coloring tended to occur when the film was exposed at a humid environment and the like.

A surface treatment film containing at least one metal selected from the group consisting of Al, Mg, and Zn, a vanadium compound having a valence of four, and a phosphoric acid group is formed on a surface of the above-described plated steel sheet.

The tetravalent vanadium compound will be described. Examples of tetravalent vanadium compounds include oxides, hydroxides, sulfides, sulfates, carbonates, halides, nitrides, fluorides, carbides, cyanides, and thiocyanides of vanadium. A supply source of vanadium is not specifically limited. At least one type of them may be used alone or in combination. In particular, it is desirable to use the sulfates which exhibit best corrosion resistance among the tetravalent vanadium compounds.

Preferably, the amount of adhesion of vanadium compound per one surface of the surface treatment film is 1 to 200 mg/m$^2$ in terms of vanadium. When the amount is 200 mg/m$^2$ or less, excellent paint adhesion is exhibited and there is an economic advantage as well. Further preferably, the amount is 3 to 175 mg/m$^2$, and more preferably is 5 to 100 mg/m$^2$.

The phosphoric-acid group will be described. In general, an acid group refers to a portion remaining after at least one hydrogen atom capable of substituting for a metal is removed from the acid molecule. The phosphoric acid group refers to a portion remaining after at least one hydrogen atom capable of substituting for a metal is removed from a phosphoric acid analog. Such a phosphoric acid analog refers to an acid or the like containing phosphorous. Examples thereof include a series of acids generated by various degrees of hydration of phosphorous pentoxide; orthophosphoric acid; metaphosphoric acid; condensed phosphoric acids, e.g., pyrophosphoric acid, tripolyphosphoric acid, and polyphosphoric acids; and phosphorous acid and the like, e.g., phosphorous acid and hypophosphorous acid. The phosphoric acid group is water-soluble. Examples of water-soluble phosphoric acid compounds which generate phosphoric acid groups include the above-described phosphoric acid analog and various salts thereof. At feast one type of them can be used alone or in combination. When orthophosphoric acid is taken as an example, primary phosphates, secondary phosphates, tertiary phosphates, and the like correspond to the various salts. Preferably, the amount of adhesion of phosphoric acid group per one surface of the film is 5 to 800 mg/m$^2$ in terms of phosphorous. When the amount of adhesion is 5 mg/m$^2$ or more, satisfactory concision resistance is exhibited. On the other hand, excessive addition provides an economic disadvantage. Therefore, a guideline of an upper limit is set at 800 mg/m$^2$. However, since the amount of phosphoric acid group also depends on the resin properties significantly, the amount of addition can be selected from these points of view.

Preferably, the amount is 10 to 700 mg/m$^2$, and more preferably is 20 to 600 mg/m$^2$.

The at least one metal selected from the group consisting of Al, Mg, and Zn will be described.

We conducted research to find inorganic compounds for a surface treatment, the inorganic compound causing no, coloring, exhibiting excellent film appearance, and exhibiting excellent corrosion resistance. As a result, it was found that particularly excellent corrosion resistance was exhibited by forming a film composed of a tetravalent vanadium compound and a phosphoric acid group on a surface of the above-described plated steel sheet. This film was able to be formed by applying a surface treatment solution in which the tetravalent vanadium compound and phosphoric acid are blended and, thereafter, conducting drying. However, the film composed of the tetravalent vanadium compound and phosphoric acid exhibited unsatisfactory dissolution resistance. It was made clear that there were problems. For example, when a film was stacked in a wet state, a part of the film was dissolved to cause variations in appearance, and the adhesion of fim was deteriorated due to wetting, so that the film was readily peeled off.

Consequently, various studies were conducted to overcome this problem. As a result, it was found that the dissolution resistance of the film was improved significantly by adding at least one metal component selected from the group consisting of Zn, Al, and Mg to the film. The form of addition of the metal component is not specifically limited. In general, the metal is added to the film as a part of a metal compound. Therefore, the metal compound may be a metal contained as a part of the above-described phosphoric acid based compound or be a metal contained as a part of other metal compounds. The combination of the tetravalent vanadium compound and at least one metal selected from the group consisting of Zn, Al, and Mg contributes significantly to excellent corrosion resistance and surface appearance.

That is, the at least one metal selected from the group consisting of Zn, Al, and Mg includes an ion, a simple substance, and/or a compound of the metal. The compound of the metal is not specifically limited. The simultaneous presence of metals and metal compounds other than this in the film is not excluded. However, as a matter of course, to prevent pollution, chromium and chromium compounds are excluded. This is because a chromium-free film is thereby produced.

Preferable examples of supply sources of the metal include oxides, hydroxides, sulfides, sulfates, carbonates, halides, nitrides, fluorides, carbides, cyanides, and thiocyanides of Al, Mg, or Zn. Most of all, fluorides, nitrates, and sulfates are preferable. The metal can also be added as salts of the above-described soluble phosphoric acid analog (for example, aluminum primary phosphate, magnesium primary phosphate, and zinc primary phosphate). Preferably, the amount of addition of the metal is specified to be $\{(Al+Mg+Zn)/P\}=0.3$ to 1.2 on a mass ratio basis in terms of an element. When the ratio is 0.3 or more, the water resistance becomes satisfactory, the corrosion resistance is increased, and coloring of the film does not occur in a humid environment. When the ratio is 1.2 or less, metal ions become rich and deposit, so that the treatment solution is stabilized and, therefore, this is preferable.

The reason the corrosion resistance is improved by forming the chromium-free film containing at least one metal selected from the group consisting of Al, Mg, and Zn, a tetravalent vanadium compound, and a phosphoric acid group on the surface of the plated steel sheet is not certain. However, it is assumed that the following mechanism is responsible therefor.

The pentavalent vanadium compounds are general compounds among vanadium compounds, and the vanadium compounds themselves are reduced by oxidation thereof. Consequently, oxides, hydroxides, and the like are contained in the film on the plating layer surface. It is believed that the reduced vanadium presents in a mixed state of divalent, trivalent, and tetravalent vanadium compounds depending on the local difference in the degree of increase of pH during formation of the film (the local difference in the degree of increase of pH depending on the hydrogen ion consumption during reduction of vanadium compounds). That is, the forms of reduced products present stably are different depending on the pH, so that divalent, trivalent, and tetravalent vanadium compounds are formed. However, it is believed that in the film in which the formed divalent, trivalent, and tetravalent vanadium compounds are present in a mixed state, those which cannot exert the barrier effect adequate for preventing corrosion are also present, and those portions serve as starting points of corrosion.

On the other hand, the tetravalent vanadium compound effects weak oxidation in contrast to the pentavalent vanadium compound. Therefore, divalent and trivalent vanadium compounds are resistant to forming, and most of tetravalent vanadium compounds remain tetravalent and are contained in the film. It is believed that the resulting tetravalent vanadium compounds exhibit the corrosion resistance. The reason the tetravalent vanadium compound exerts an adequate barrier effect is assumed that a tetravalent vanadyl(IV) ion: $VO_2^+$ and a complex ion thereof (for example, $[VO(SO_4)_2]^{2-}$) form a dense film on the plating surface as compared with other compounds. According to our experiments, most of the tetravalent vanadium compounds used remained tetravalent actually in the formed film. Therefore, it is an adequate level that 70 percent by mass or more of vanadium in the film is tetravalent. Preferably, it is 80 percent by mass or more, and more preferably is 95 percent by mass or more. These can be determined from the area ratio of each peak, on a valence basis, resulting from resolution of the 2p peak of vanadium obtained by X-ray photoelectron spectroscopy.

Corrosion resistance can be dramatically improved by adding a phosphoric acid compound and the tetravalent vanadium compound in combination. It is believed that an interfacial reaction between the treatment solution and the metal, is responsible therefor since the corrosion resistance is improved regardless of the surface condition of the plated steel sheet. That is, it is assumed that the etching reaction on the plating surface is increased by blending the phosphoric acid compound in the surface treatment film. An interfacial reaction layer containing vanadium and phosphorous is formed on the surface of the plating layer activated by this etching reaction, and a dense film firmly adhered to the plating metal is formed.

Furthermore, antirust components which are readily eluted in a humid environment can be made to have poor solubility by adding at least one metal selected from the group consisting of Al, Mg, and Zn to the film. Since the elution portion is covered by the film, excellent corrosion resistance can be maintained for a long time and, in addition, coloring of the film resulting from the elution of the antirust components is reduced.

Additional components other than the above-described components, for example, at least one of Ca, Ca based compounds, $SiO_2$, other silicic acid based compounds, Ta, Nb, Ta based compounds, and Nb based compounds can be added to the surface treatment film. These components are added in order to further improve the corrosion resistance. For example, sodium silicate and calcium carbonate are appropriately added to a phosphoric acid compound (zinc phosphate, zinc polyphosphate, aluminum tripolyphosphate, or the like) in a dispersed state in water, the resulting deposits are washed with water, and the residue from which soluble components have been removed can be used as this additive. Colloidal silica (wet-process silica) or dry-process silica can be used as $SiO_2$. Ta and Nb can be added as fluorides and the like. The types and addition methods of these compounds are not specifically limited.

At least One compound selected from oxide fine particles (for example, silicon oxide, aluminum oxide, zirconium oxide, titanium oxide, cerium oxide, and antimony oxide), phosphates (for example, zinc phosphate, aluminum dihydrogen phosphate, and zinc phosphite), molybdates, phosphomolybdates (aluminum phosphomolybdate and the like), vanadates, organic phosphoric acids and salts thereof (for example, phytic acid, phytates, phosphonic acid, phosphonates, and metal salts thereof, and alkali metal silts), organic inhibitors (for example, hydrazine derivatives, thiol compounds, and dithiocarbamates), organic compounds (polyethylene glycol), and the like serving as a rust inhibitor to improve the corrosion resistance may be further added to the surface treatment film.

Other additives, e.g., organic color pigments (for example, fused polycyclic organic pigments and phthalocyanine organic pigments), color dyes (for example, organic solvent azo dyes and water-soluble azo metal dyes), coupling agents (for example, silane coupling agents and titanium coupling agents), inorganic pigments (titanium oxide), chelating agents (thiol and the like), and melamine-cyanuric acid adducts, may be added to the surface treatment film.

The film is produced by a method including the steps of adhering a Cr-free treatment solution containing at least one metal selected from the group consisting of Al, Mg, and Zn, a tetravalent vanadium compound, and a phosphoric acid group to a plating layer containing at least one metal selected from the group consisting of zinc and aluminum, the plating layer disposed on at least one surface of a steel sheet, and thereafter, conducting drying at a peak sheet temperature of 60° C. to 250° C.

The method for forming the surface treatment film on a surface of the plated steel sheet may be a usually adopted method. In a method for adhering the treatment solution, for example, a surface treatment composition is treated by a coating method, an immersion method, a spraying method, or the like and, thereafter, heat-drying is conducted. The coating treatment method is any one of methods of a combination of spraying and roll-squeezing, a roll coater (three-roll system, two-roll system, and the like), a squeeze coater, and the like. Alternatively, it is also possible to adjust the amount of coating by an air knife method or a roll-squeezing method, ensure uniform appearance, and ensure uniform film thickness after the coating treatment with the squeeze coater or the like, the immersion treatment, or the spraying treatment is conducted. For example, a dryer, a hot-air oven, a high-frequency induction furnace, an electric furnace, an infrared furnace, and the like can be used as the heat-drying device.

The drying treatment is conducted at a peak sheet temperature of 60° C. to 250° C. When the drying temperature is 60° C. or more, the film is formed satisfactorily, and the film exhibits excellent corrosion resistance and the like. On the other hand, when the drying temperature exceeds 250° C., the corrosion resistance effect is saturated. Furthermore, the heat resistance of the organic resin is also taken into consideration, and the upper limit is specified to be 250° C. Preferably, the drying temperature is 80° C. to 180° C. or less.

It is desirable that the thickness of the surface treatment film is 5 µm or less after the above-described heat-drying. When the thickness is 5 µm or less, the film is formed satisfactorily during even a low-temperature drying and, therefore, the corrosion resistance is improved. Preferably, the thickness is 3 µm or less, and more preferably is 2 µm or less.

A surface treated steel sheet exhibiting excellent corrosion resistance and surface appearance can be produced by the surface treatment film formed as described above. However, an organic resin is further blended into the surface treatment film. Alternatively, an organic resin coating layer can be further disposed on the surface treatment film. The film can exhibit further improved corrosion resistance by this organic resin, and at the same time, the film can also exhibit excellent surface appearance and workability in combination.

The film further containing the organic resin is produced by further adding an organic resin to the treatment solution in the above-described manufacturing method. Conversely, the components of the treatment solution may be added to a dispersion or solution of the organic resin, as a matter of course. However, since it is preferable that the treatment solution is an aqueous solution, preferably the organic resin to be used is water-soluble or water-dispersible. In every case, preferably the amount of adhesion of organic resin per one surface is 0.5 to 5 $g/m^2$. When the amount of adhesion of organic resin is 0.5 $g/m^2$ or more, the workability is improved and galling of plating by working can be prevented. On the other hand, when the amount of adhesion of organic resin is controlled at 5 $g/m^2$ or less, the film does not adhere to the roll during roll forming and, therefore, this is preferable. From the above-described viewpoint, a more preferable range of the amount of adhesion of organic resin is 1.0 to 4.5 $g/m^2$, and 1.5 to 4 $g/m^2$ is further desirable.

The surface treatment film is formed by the above-described manufacturing method, a treatment solution containing the organic resin is adhered and, thereafter, drying is conducted at a peak sheet temperature of 60° C. to 250° C., so that the organic resin coating layer is disposed on the surface treatment film. In this case, since it is preferable that a water based treatment solution is used in the formation of the surface treatment film, preferably an organic solvent is used for the solution to contain organic resin to be adhered thereafter for the reason of water repellency. In the method for disposing the organic resin coating layer on the surface treatment film as well, preferably the amount of adhesion of organic resin per one surface is 0.5 to 5 $g/m^2$. Preferably, the thickness of the organic resin coating layer is 0.01 to 5 µm.

Of these two manufacturing methods, the method in which the organic resin coating layer is disposed on the surface treatment film tends to hold superiority from the viewpoint of the corrosion resistance. On the other hand, the method in which the organic resin is further blended into the surface treatment film has the advantage from the viewpoint of the load on the equipment. However, the quality at a required level can be attained in both cases.

In both methods, a core-shell type water-dispersible resin in which the type of resin in a core portion of a resin particle is different from the type of resin in the shell portion or in which the resins have different glass transition temperatures can also be used in order to lower the drying temperature of the resin. Furthermore, it is possible to take advantage of crosslinking between particles through the use of formation of the silanol group due to hydrolysis of alkoxysilane and dehydration and condensation reaction of silanol groups between resin particles during heat-drying of the resin by using a water-dispersible resin having a self-crosslinking property and, for example, providing a resin particle with an alkoxysilane group. In addition, organic compound silicate in which an organic resin is compounded with silica through a silane coupling agent is also suitable.

The organic resin to be used as described above is not specifically limited, and epoxy resins, urethane resins, acrylic resins, acrylic silicon resins, acryl-ethylene copolymers, acryl-styrene copolymers, alkyd resins, polyester resins, ethylene resins, fluororesins, and the like can be used. At least one of them can be used alone or in combination. In particular, it is preferable to use an organic resin having OH groups and/or COOH groups or having been modified to have them from the viewpoint of the corrosion resistance.

Examples of the above-described organic resins having OH groups and/or COOH groups can include epoxy resins, polyhydroxy polyether resins, acrylic resins, ethylene-acrylic acid copolymer resins, alkyd resins, phenol resins, polyurethane resins, and polyamide resins. Polybutadiene resins, polyamine resins, polyphenylene resins, and those in which OH groups and/or COOH groups have been introduced into mixtures or addition polymerization products of at least two of these resins can also be used. At least one of these resins can be used alone or in combination.

The above-described polyhydroxy polyether resins are polymers produced by polycondensing mononuclear type or binuclear type dihydric phenol or mixed dihydric phenol of mononuclear type and binuclear type with substantially equal moles of epihalohydrin in the presence of an alkali catalyst. Typical examples of mononuclear type dihydric phenol include resorcin, hydroquinone, and catechol. Typical examples of binuclear type dihydric phenol include bisphenol A. At least one of them may be used alone or in combination.

The above-described epoxy resin can be an epoxy resin prepared by glycidyl etherifying bisphenol A, bisphenol F, novolac, or the like; an epoxy resin prepared by adding propylene oxide, ethylene oxide, or polyalkylene glycol to bisphenol A followed by glycidyl etherifying; an aliphatic epoxy resin; an alicyclic epoxy resin; a polyether based epoxy resin; or the like. It is desirable that these epoxy resins have number average molecular weights of 1,500 or more particularly in the case where curing at a low temperature is required. The above-described epoxy resins may be used alone, or different types of epoxy resins can be used in combination. Modified epoxy resins can also be used. Resins prepared by reacting various modifiers with epoxy groups or hydroxyl groups in the above-described epoxy resins are used. Examples thereof can include epoxyester resins prepared by reacting carboxylic groups in drying oil aliphatic acids; epoxyacrylate resins modified by acrylic acid, methacrylic acid, and the like; urethane-modified epoxy resins prepared by reacting isocyanate compounds; and urethane-modified epoxy resin-amine adducts prepared by adding alkanolamine to urethane-modified epoxy resins produced by reacting isocyanate compounds with epoxy resins.

Examples of the above-described urethane resins can include oil-modified polyurethane resins, alkyd based polyurethane resins, polyester based polyurethane resins, polyether based polyurethane resins, and polycarbonate based polyurethane resins.

Examples of the above-described acrylic resins include polyacrylic acids and copolymers thereof, polyacrylic esters and copolymers thereof, polymethacrylic acids and copolymers thereof, polymethacrylic esters and copolymers thereof, urethane-acrylic acid copolymers (or urethane-modified acrylic resins), and styrene-acrylic acid copolymers. Furthermore, resins prepared by modifying these resins with other alkyd resins, epoxy resins, phenol resins, and the like may be used.

Examples of the above-described acrylic silicon resins include resins in which hydrolyzable alkoxysilyl groups are contained in side chains or at terminals of acrylic copolymers as primary agents and curing agents are added. When these acrylic silicon resins are used, excellent weather resistance can be expected.

Examples of the above-described alkyd resins can include oil-modified alkyd resins, rosin-modified alkyd resins, phenol modified alkyd resins, styrenated alkyd resins, silicon-modified alkyd resins, acryl-modified alkyd resins, oil-free alkyd resins, and high-molecular-weight oil-free alkyd resins.

Examples of the above-described ethylene resins include ethylene based copolymers, e.g., ethylene-acrylic acid copolymers, ethylene-methacrylic acid copolymers, and carboxyl-modified polyolefin resins, ethylene-unsaturated carboxylic acid copolymers, and ethylene based ionomers. Furthermore, resins prepared by modifying these resins with other alkyd resins, epoxy resins, phenol resins, and the like may be used.

The above-described fluororesins include fluoroolefin based copolymers. Examples thereof include copolymers prepared by copolymerizing a monomer, e.g., alkyl vinyl ether, cycloalkyl vinyl ether, carboxylic-modified vinyl ester, hydroxyalkyl allyl ether, and tetrafluoropropyl vinyl ether with a fluorine monomer (fluoroolefin). When these fluororesins are used, excellent weather resistance and excellent hydrophobicity can be expected.

At least one of the above-described organic resins can be used alone or in combination.

In particular, it is further desirable to use thermosetting resins in order to improve the corrosion resistance and the workability. In this case, urea resins (butylated urea resins and the like), melamine resins (butylated melamine resins), butylated urea-melamine resins, amino resins, e.g., benzoguanamine resins, block isocyanate, oxazoline compounds, phenol resins, and the like can be blended.

In the above description, examples of various organic resins allowed to be present in In the above description; examples of various organic resins allowed to be present in the film or on the film are shown. Most of all, the following organic resins are particularly preferable since the corrosion resistance, the appearance quality, and the workability are mutually compatible and outstanding performance is delivered with respect to all of them.

The above-described organic resin is a copolymer resin of styrene (a), (meth)acrylic acid (b) (hereafter refers to acrylic acid or/and methacrylic acid), a (meth)acrylic ester (c) (hereafter refers to acrylic ester or/and methacrylic ester) including an alkyl chain having the carbon number of 1 to 6, and an olefin (d) capable of copolymerizing with these components (a) to (c). This resin can be used as either a water-soluble resin or a water-dispersible resin.

Preferably, the copolymer resin has a solid content of styrene (a) of 20 to 60 percent by mass, a solid content of (meth)acrylic acid (b) of 0.5 to 10 percent by mass, and a solid content of (meth)acrylic ester (c) including an alkyl chain having the carbon number of 1 to 6 of 20 to 60 percent by mass relative to 100 percent by mass of solid content of the copolymer resin. The "solid content" is defined as a solid content of a product after being dried at a peak sheet temperature of 60° C. to 250° C. regardless of whether the organic resin is present in the film or on the film. In general, such a drying takes on the order of 30 minutes. The amount of the above-described solid content can be measured by methods of infrared spectroscopy, gas chromatography-mass spectrometry, and the like.

With respect to the copolymer resin, the corrosion resistance is improved when the proportion of styrene (a) in an acrylic styrene resin is 20 percent by mass or more. On the other hand, the workability is improved when the proportion is 60 percent by mass or less. Therefore, an inexpensive surface treated steel sheet exhibiting particularly excellent corrosion resistance and workability can be produced by using the acryl-styrene based resin having a solid content of styrene (a) of 20 to 60 percent by mass relative to 100 percent by mass of solid content of the copolymer resin.

The above-described (meth)acrylic acid (b) exerts the effect of improving the dispersion stability of an emulsion and the adhesion to a metal surface. The proportion of the solid content of (meth)acrylic acid is specified to be 0.5 to 10 percent by mass relative to 100 percent by mass of solid content of the copolymer resin, preferably be 0.5 to 7 percent by mass, and more preferably be 1 to 4 percent by mass. It is preferable that the proportion of the solid content of (meth)acrylic acid (b) is 0.5 percent by mass or more, since the stability of the emulsion and the adhesion to a metal surface is improved. On the other hand, it is preferable that the proportion is 10 percent by mass or less, since the hydrophilicity of the film is reduced and, thereby, the water resistance is improved.

Examples of the above-described (meth)acrylic ester (c) including an alkyl chain having the carbon number of 1 to 6 include methyl methacrylate and isomers thereof, n-propyl (meth)acrylate and isomers thereof, n-butyl (meth)acrylate and isomers thereof, n-pentyl (meth)acrylate and isomers thereof, and n-hexyl (meth)acrylate and isomers thereof. At least one of them can be used. The (meth)acrylic ester contributes to an improvement of the workability of the film. The film produced from the organic resin in which the carbon number in an alkyl chain of the (meth)acrylic ester is 6 or less exhibits high workability, and the film is not readily peeled by sliding over a mold in the working. Therefore, a (meth)acrylic ester including an alkyl chain having the carbon number of 6 or less, preferably of 3 to 5, is used. The solid content of (meth)acrylic ester (c) including an alkyl chain having the carbon number of 1 to 6 is specified to be 20 to 60 percent by mass relative to 100 percent by mass of solid content of the copolymer resin, preferably be 20 to 55 percent by mass, and more preferably be 25 to 55 percent by mass. It is preferable that the solid content of (meth)acrylic ester (c) including an alkyl chain having the carbon number of 1 to 6 is 20 percent by mass or more, since a high effect is exerted on an improvement of the workability of the film. On the other hand, it is preferable that the solid content is 60 percent by mass or less, since the absolute volume of styrene which exerts an effect on an improvement of the corrosion resistance of the film is increased. The ratio of the methacrylic ester to the acrylic ester is not specifically limited. All the (meth)acrylic ester contained in the copolymer resin may be the methacrylic ester or the acrylic ester.

The type of the vinyl monomer (d) capable of copolymerizing with the above-described components (a) to (c) is not specifically limited. Examples thereof include 2-hydroxyethyl (meth)acrylate, hydroxypropyl (meth)acrylate, acrylamide, N-methylolacrylamide, diacetone acrylamide, glycidyl methacrylate, vinyltoluene, vinyl acetate, acrylonitrile, methyl (meth)acrylate, ethyl (meth)acrylate, and (meth)acrylic esters including an alkyl chain having the carbon number of 7 or more. At least one of them can be used. The solid content of the vinyl monomer (d) relative to 100 percent by mass of solid content of the copolymer resin is not specifically limited, but it is preferable that the solid content is specified to be 40 percent by mass or less and the vinyl monomer (d) is blended at a proportion at which the glass transition temperature of the copolymer resin can be adjusted within the range of 10° C. to 70° C., preferably of 15° C. to 60° C.

The effect of this high-performance copolymer resin is exerted effectively when the copolymer is used in combination with an Al—Zn alloy plating steel sheet in which the Al content in the plating film is 25 to 75 percent by mass. This is because particularly excellent corrosion resistance (red rust resistance) can be achieved at a high Al content in this range. When large amounts of Al is contained in the film, a problem occurs in that corrosion of Al causes generation of black rust. Although the rust preventive property is maintained against the red rust, there is a drawback that the appearance quality is deteriorated significantly. In the case where the plated steel sheet having a high Al content is used without painting, it is preferred that the appearance after plating is kept without being treated. Consequently, smoothing of the surface by skin pass is not conducted seriously, so that asperities in the state of being formed are left on the plating surface. If the plating surface in this state is processed by, for example, roll forming, galling occurs on the plating surface due to contact with the roll so as to cause damage to the roll. In addition, there is a quality problem in that the appearance after molding becomes poor. Therefore, a significant effect is exerted on an improvement of the property of the high-Al—Zn alloy plated steel sheet.

If necessary, each of the above-described organic resins can be blended with a solid lubricant for the purpose of improving the workability of the film. Such a solid lubricant is not specifically limited. Examples thereof can include aliphatic acid ester wax that is a product resulting from esterification of a polyol compound and an aliphatic acid, silicon based wax, fluorine based wax, polyolefin wax, e.g., polyethylene, lanolin based wax, montan wax, microcrystalline Wax, and carnauba wax. At least one of the solid lubricants can be used alone or in combination. The amount of blending of the solid lubricant is specified to be 1 to 50 parts by mass (solids) relative to 100 parts by mass (solids) of resin, and preferably be 3 to 30 parts by mass (solids). When the amount of blending of the solid lubricant is 1 part by mass or more, a lubricating effect is exerted. On the other hand, it is preferable that the amount of blending is 50 parts by mass or less since the paintability is improved. Furthermore, it is desirable that the film contains the above-described curing agent, a rust inhibitor, or the like from the viewpoint of an improvement of the corrosion resistance.

EXAMPLES

Single-Layer Treatment Method

A treatment solution containing each of components shown in Table 2 to Table 5 was applied to a surface of a plated steel sheet shown in Table 1. Thereafter, heat-drying was conducted at a peak temperature of 150° C., so that a surface treated steel sheet was produced (corresponding to a "single-layer treatment" shown in Table 6). In addition, each of the production conditions of Invention example 1 and Invention example 22 was changed in such a way that only the peak temperature was changed to 40° C. or 350° C., and heat-drying was conducted. The resulting surface treated steel sheet exhibited poor white rust resistance and blackening resistance, and in particular, the white rust resistance became significantly poor (the evaluation results are not shown).

Double-Layer Treatment Method

In Invention example 33 and Invention example 48, a treatment solution containing each of components shown in Table 2 to Table 4 was applied to a surface of a plated steel sheet shown in Table 1. Heat-drying was conducted at a peak temperature of 150° C. Thereafter, a treatment solution containing an organic resin shown in Table 5 was applied thereon, and heat-drying was conducted again at a peak temperature of 150° C., so that a surface treated steel sheet was produced (corresponding to a "double-layer treatment" shown in Table 6).

The white rust resistance, the blackening resistance, coloring variations in appearance after water resistance test, and the workability (galling resistance) of each of the thus produced surface treated materials were evaluated. The results are shown in Table 7-1 to Table 7-4 together with the production condition of each surface treated material.

Each of the above-described performance evaluations was conducted by the following test.

(1) White Rust Resistance

Each sample was subjected to a salt spray test (JIS-Z-2371), and evaluation was conducted based on the white rust area percentage after a lapse of 120 hours and 240 hours.

The criteria of judgment are as described below.

⊙: white rust area percentage less than 5%

○: white rust area percentage 5% or more and less than 10%

○–: white rust area percentage 10% or more and less than 25%

Δ: white rust area percentage 25% or more and less than 50% x: white rust area percentage 50% or more

As is clear from Table 7-1 to Table 7-4, in Invention examples, both the film appearance after humidity cabinet test and the white rust resistance (corrosion resistance) are excellent, and particularly in Invention example in which the amount of adhesion is controlled within a suitable range, the white rust resistance (corrosion resistance) is further improved. On the other hand, in Comparative examples, at least one of the film appearance after humidity cabinet test and the white rust resistance (corrosion resistance) is inferior to those in Invention examples.

(2) Blackening Resistance

With respect to each sample of the surface treated material, samples prepared under the same condition were brought into a stacked state while treated surfaces are faced to each other. After standing for 14 days and 28 days in an environment at 50° C. and a relative humidity of 98%, appearance was visually evaluated. The criteria of evaluation are as described below.

⊙: there is no blackened portion

○: there is a portion lightly blackened to an extent that can be visually identified from a slanting direction (less than 10% of surface area)

Δ: there is a portion lightly blackened to an extent that can be visually identified from a slanting direction (10% or more of surface area) or a portion clearly blackened (less than 10% of surface area)

x: there is a portion clearly blackened (10% or more of surface area)

(3) Coloring Variations in Appearance after Water Resistance Test

With respect to each sample of the surface treated material, samples prepared under the same condition were brought into a stacked state while treated surfaces are faced to each other. After standing for 5 days in an environment at 50° C. and a relative humidity of 98%, appearance was visually evaluated. The criteria of evaluation are as described below.

○: uniform appearance with no variation

Δ: variations in appearance are somewhat conspicuous x: variations in appearance are conspicuous (4) Film Adhesion after Water Resistance Test With respect to each sample of the surface treated material, samples prepared under the same condition were brought into a stacked state while treated surfaces are faced to each other. After standing for 5 days in an environment at 50° C. and a relative humidity of 98%, a cross-cut adhesion test and tape peeling were conducted. The evaluation was conducted based on the presence or absence of peeling of the film. The criteria of evaluation are as described below.

○: no peeling of the film was observed x: peeling of the film was observed (5) Workability (Galling Resistance)

With respect to each sample of the surface treated material, a test in which a bead having a radius of curvature of the end of 5 mm was pressed against a sample surface at 10 N/m² and the sample in that state was pulled out at a constant speed was repeated 7 times, and the degree of blackening of the surface or peeling of the film was evaluated.

The criteria of evaluation are as described below.

⊙: a blackened portion is less than 10%, and peeling is not observed

○: a blackened portion is 10% or more and 25% or less, and peeling is less than 10%

Δ: a blackened portion is 25% or more, and peeling is less than 10%

Δ-: peeling is 10% or more and 25% or less x: peeling is 25% or more

TABLE 1

| | Plated steel sheet | |
|---|---|---|
| No. | Type | Amount of plating (amount of adhesion to both surfaces) |
| 1 | 55% Al—Zn alloy plating steel sheet | 150 g/m² |
| 2 | 5% Al—Zn alloy plating steel sheet | 220 g/m² |
| 3 | galvanized steel | 270 g/m² |
| 4 | galvanized steel | 120 g/m² |

TABLE 2

| | Vanadium compound | |
|---|---|---|
| No. | Valence of vanadium | Type |
| 1 | tetravalent | $VOSO_4$ |
| 2 | tetravalent | $VO(C_5H_7O_2)_2$ |
| 3 | tetravalent | $VCl_4$ |
| 4 | tetravalent | $V_2O_4$ |
| 5 | pentavalent | $NH_4VO_3$ |
| 6 | pentavalent | $VOCl_3$ |
| 7 | pentavalent | $V_2O_5$ |
| 8 | trivalent | $VCl_3$ |
| 9 | trivalent | $V_2O_3$ |
| 10 | divalent | $VO$ |

TABLE 3

| Phosphoric acid compound | |
|---|---|
| No. | Type |
| 1 | $H_3PO_4$ |
| 2 | $(NH_4)H_2PO_4$ |
| 3 | $Mg(H_2PO_4)_2$ |
| 4 | $Al(H_2PO_4)_3$ |
| 5 | $Zn(H_2PO_4)_2$ |
| 6 | $Mn(H_2PO_4)_2$ |
| 7 | $Ni(H_2PO_4)_2$ |
| 8 | $Co(H_2PO_4)_2$ |

TABLE 4

| Metal compound | |
|---|---|
| Code | Type |
| A | zinc nitrate |
| B | aluminum nitrate |
| C | magnesium nitrate |
| D | magnesium sulfate |

TABLE 5

| Organic resin | | |
|---|---|---|
| | Constituent monomers of acrylic styrene resin (percent by mass) *1 *2 | |
| No. Type | monomer (a) | monomer (b) |
| 1 acrylic resin | | |

TABLE 5-continued

Organic resin

Constituent monomers of acrylic styrene resin (percent by mass) *1 *2

| No. | Type | monomer (a) | | monomer (b) | |
|---|---|---|---|---|---|
| 2-1 | acrylic styrene resin | St(60) | AA(1) | HMA(35) | 2HEA(4) |
| 2-2 | | St(55) | MA(2) | BMA(30) | 2EHA(13) |
| 2-3 | | St(45) | MA(4) | BMA(30) + iso-PA(19) | GMA(2) |
| 2-4 | | St(35) | MA(5) | BMA(20) | 2EHA(40) |
| 2-5 | | St(38) | AA(5) | BA(32) | 2EHA(25) |
| 2-6 | | St(38) | AA(5) | MMA(25) | 2EHA(32) |
| 2-7 | | St(15) | AA(5) | HMA(60) | 2HEA(20) |
| 2-8 | | St(80) | AA(2) | BMA(15) | GMA(3) |
| 2-9 | | St(50) | — | HMA(48) | GMA(2) |
| 2-10 | | St(60) | MA(5) | — | 2EHA(35) |
| 2-11 | | St(30) | MA(5) | HMA(65) | — |
| 3 | aliphatic polyester skeleton urethane resin | | | | |
| 4 | aromatic polyester skeleton urethane resin | | | | |

*1 St: styrene, AA: acrylic acid, MA: methacrylic acid, HMA: n-hexyl methacrylate BMA: n-butyl methacrylate, iso-PA: isopropyl acrylate, 2HEA: 2-hydroxypropyl acrylate 2EHA: 2-ethylhexyl acrylate, GMA: glycidyl methacrylate, MMA: methyl methacrylate BA: butyl acrylate

*2 Each monomer has a solid content of 30 percent by mass. Each number in parentheses is a proportion of solids (percent by mass) of each monomer relative to 100 percent by mass of solid content of copolymer resin

TABLE 6

Treatment method

| No. | Type |
|---|---|
| a | single-layer treatment |
| b | double-layer treatment (lower layer: inorganic film/upper layer: organic resin coating layer) |

TABLE 7-1

| Group | No. | Plated steel sheet *1 | Vanadium compound Type *2 | Vanadium compound Amount of adhesion mg/m² *3 | Phosphoric acid compound Type *4 | Phosphoric acid compound Amount of adhesion mg/m² *5 | Metal component Type *6 | Metal component Amount of adhesion mg/m² *7 | Organic resin Type *8 | Organic resin Amount of adhesion g/m² |
|---|---|---|---|---|---|---|---|---|---|---|
| Invention example | 1 | 1 | 1 | 20 | 3 | 20 | 3 | 7.2 | — | — |
| Invention example | 2 | 1 | 1 | 20 | 4 | 20 | 4 | 6.6 | — | — |
| Invention example | 3 | 1 | 1 | 20 | 5 | 20 | 5 | 15.6 | — | — |
| Invention example | 4 | 1 | 1 | 20 | 1 | 20 | A | 15.6 | — | — |
| Invention example | 5 | 1 | 1 | 20 | 1 | 20 | B | 6.6 | — | — |
| Invention example | 6 | 1 | 1 | 20 | 1 | 20 | C | 7.2 | — | — |
| Invention example | 7 | 1 | 1 | 20 | 1 | 20 | D | 7.2 | — | — |
| Invention example | 8 | 1 | 2 | 20 | 3 | 20 | 3 | 7.2 | — | — |
| Invention example | 9 | 1 | 3 | 20 | 3 | 20 | 3 | 7.2 | — | — |
| Invention example | 10 | 1 | 4 | 20 | 3 | 20 | 3 | 7.2 | — | — |
| Invention example | 11 | 2 | 1 | 20 | 3 | 20 | 3 | 7.2 | — | — |
| Invention example | 12 | 3 | 1 | 20 | 3 | 20 | 3 | 7.2 | — | — |
| Invention example | 13 | 4 | 1 | 20 | 3 | 20 | 3 | 7.2 | — | — |
| Invention example | 14 | 1 | 1 | 50 | 3 | 20 | 3 | 7.2 | — | — |
| Comparative example | 1 | 1 | 1 | 20 | — | 0 | — | 0 | — | — |
| Comparative example | 2 | 1 | 1 | 20 | 1 | 20 | — | 0 | — | — |
| Comparative example | 3 | 1 | 1 | 20 | 2 | 20 | — | 0 | — | — |
| Comparative example | 4 | 1 | 1 | 20 | 6 | 20 | 6 | 11.4 | — | — |
| Comparative example | 5 | 1 | 1 | 20 | 7 | 20 | 7 | 11.4 | — | — |
| Comparative example | 6 | 1 | 1 | 20 | 8 | 20 | 8 | 11.4 | — | — |
| Comparative example | 7 | 1 | 5 | 20 | 3 | 20 | 3 | 7.2 | — | — |
| Comparative example | 8 | 1 | 6 | 20 | 3 | 20 | 3 | 7.2 | — | — |
| Comparative example | 9 | 1 | 7 | 20 | 3 | 20 | 3 | 7.2 | — | — |
| Comparative example | 10 | 1 | 8 | 20 | 3 | 20 | 3 | 7.2 | — | — |
| Comparative example | 11 | 1 | 9 | 20 | 3 | 20 | 3 | 7.2 | — | — |
| Comparative example | 12 | 1 | 10 | 20 | 3 | 20 | 3 | 7.2 | — | — |
| Comparative example | 13 | 1 | — | 0 | 3 | 20 | 3 | 7.2 | — | — |
| Comparative example | 14 | 1 | 1 | 250 | 3 | 20 | 3 | 7.2 | — | — |

TABLE 7-1-continued

| | | | Treatment method | | Quality evaluation *10 | | | |
| | | | | | White rust | Blackening | After water resistance test | |
| | | | | Drying | resistance | resistance | Coloring | Film |
| Group | No. | Type *9 | temperature °C. | *11 | *12 | variation | adhesion |
|---|---|---|---|---|---|---|---|
| Invention example | 1 | a | 150 | ⊚ | ○ | ○ | ○ |
| Invention example | 2 | a | 150 | ○ | ○ | ○ | ○ |
| Invention example | 3 | a | 150 | ○ | ○ | ○ | ○ |
| Invention example | 4 | a | 150 | ○ | ○ | ○ | ○ |
| Invention example | 5 | a | 150 | ○ | ○ | ○ | ○ |
| Invention example | 6 | a | 150 | ⊚ | ○ | ○ | ○ |
| Invention example | 7 | a | 150 | ⊚ | ○ | ○ | ○ |
| Invention example | 8 | a | 150 | ○ | ○ | ○ | ○ |
| Invention example | 9 | a | 150 | ○ | ○ | ○ | ○ |
| Invention example | 10 | a | 150 | ○ | ○ | ○ | ○ |
| Invention example | 11 | a | 150 | ○ | ○ | ○ | ○ |
| Invention example | 12 | a | 150 | ○ | ○ | ○ | ○ |
| Invention example | 13 | a | 150 | ○ | ○ | ○ | ○ |
| Invention example | 14 | a | 150 | ○ | ○ | ○ | ○ |
| Comparative example | 1 | a | 150 | X | X | △ | ○ |
| Comparative example | 2 | a | 150 | ⊚ | ○ | △ | ○ |
| Comparative example | 3 | a | 150 | △ | △ | △ | ○ |
| Comparative example | 4 | a | 150 | ○ | ○ | △ | ○ |
| Comparative example | 5 | a | 150 | △ | ○ | △ | ○ |
| Comparative example | 6 | a | 150 | △ | ○ | △ | ○ |
| Comparative example | 7 | a | 150 | △ | ○ | X | ○ |
| Comparative example | 8 | a | 150 | △ | ○ | X | ○ |
| Comparative example | 9 | a | 150 | △ | ○ | X | ○ |
| Comparative example | 10 | a | 150 | △ | △ | — | — |
| Comparative example | 11 | a | 150 | △ | △ | — | — |
| Comparative example | 12 | a | 150 | △ | △ | — | — |
| Comparative example | 13 | a | 150 | X | X | — | — |
| Comparative example | 14 | a | 150 | X | X | — | — |

*1 plated steel sheet No. in Table 1
*2 vanadium compound No. in Table 2
*3 in terms of vanadium
*4 phosphoric acid compound No. in Table 3
*5 in terms of phosphorous
*6 metal oxide code in Table 4 or phosphoric acid compound No. in Table 3
*7 in terms of metal (Al, Mg, Zn)
*8 "—" indicates that no organic resin was included
*9 treatment method code in Table 6
*10 "—" indicates that test was not conducted
*11 evaluated after a lapse of 120 hours
*12 evaluated after a lapse of 14 days

TABLE 7-2

| | | Plated steel sheet *1 | Vandium compound | | Phosphoric acid compound | | Metal component | | Organic resin | |
| Group | No. | | Type *2 | Amount of adhesion mg/m² *3 | Type *4 | Amount of adhesion mg/m² *5 | Type *6 | Amount of adhesion mg/m² *7 | Type *8 | Amount of adhesion g/m² |
|---|---|---|---|---|---|---|---|---|---|---|
| Invention example | 15 | 1 | 1 | 20 | 3 | 20 | 3 | 7.2 | 1 | 1.5 |
| Invention example | 16 | 1 | 1 | 20 | 4 | 20 | 4 | 6.6 | 1 | 1.5 |
| Invention example | 17 | 1 | 1 | 20 | 5 | 20 | 5 | 15.6 | 1 | 1.5 |
| Invention example | 18 | 1 | 1 | 20 | 1 | 20 | A | 15.6 | 4 | 1.5 |
| Invention example | 19 | 1 | 1 | 20 | 1 | 20 | B | 6.6 | 1 | 1.5 |
| Invention example | 20 | 1 | 1 | 20 | 1 | 20 | C | 7.2 | 1 | 1.5 |
| Invention example | 21 | 1 | 1 | 20 | 1 | 20 | D | 7.2 | 1 | 1.5 |
| Invention example | 22 | 1 | 1 | 20 | 3 | 20 | 3 | 7.2 | 2-6 | 1.5 |
| Invention example | 23 | 1 | 1 | 20 | 3 | 20 | 3 | 7.2 | 3 | 1.5 |
| Invention example | 24 | 1 | 1 | 20 | 3 | 20 | 3 | 7.2 | 4 | 1.5 |
| Invention example | 25 | 1 | 2 | 20 | 3 | 20 | 3 | 7.2 | 1 | 1.5 |
| Invention example | 26 | 1 | 3 | 20 | 3 | 20 | 3 | 7.2 | 1 | 1.5 |
| Invention example | 27 | 1 | 4 | 20 | 3 | 20 | 3 | 7.2 | 1 | 1.5 |
| Invention example | 28 | 2 | 1 | 20 | 3 | 20 | 3 | 7.2 | 1 | 1.5 |
| Invention example | 29 | 3 | 1 | 20 | 3 | 20 | 3 | 7.2 | 1 | 1.5 |
| Invention example | 30 | 1 | 1 | 50 | 3 | 20 | 3 | 7.2 | 1 | 1.5 |
| Invention example | 31 | 1 | 1 | 20 | 3 | 20 | 3 | 7.2 | 1 | 3 |
| Invention example | 32 | 1 | 1 | 20 | 3 | 20 | 3 | 7.2 | 1 | 1.5 |

TABLE 7-2-continued

| Group | No. | | | | | | | | |
|---|---|---|---|---|---|---|---|---|---|
| Invention example | 33 | 1 | 1 | 20 | 3 | 20 | 3 | 7.2 | 1 | 1.5 |
| Invention example | 34 | 1 | 1 | 20 | 4 | 20 | 4 | 6.6 | 2-6 | 1.5 |
| Invention example | 35 | 1 | 1 | 20 | 5 | 20 | 5 | 6.6 | 2-6 | 1.5 |
| Invention example | 36 | 1 | 1 | 20 | 1 | 20 | A | 15.6 | 2-6 | 1.5 |

| | | Treatment method | | Quality evaluation *10 | | | | |
|---|---|---|---|---|---|---|---|---|
| | | | Drying | White rust | Blackening | After water resistance test | | |
| Group | No. | Type *9 | temperature °C. | resistance *13 | resistance *14 | Coloring variation | Film adhesion | Workability |
| Invention example | 15 | a | 150 | ◉ | ○ | ○ | ○ | ○ |
| Invention example | 16 | a | 150 | ○ | ○ | ○ | ○ | ○ |
| Invention example | 17 | a | 150 | ○ | ○ | ○ | ○ | ○ |
| Invention example | 18 | a | 150 | ○ | ○ | ○ | ○ | ○ |
| Invention example | 19 | a | 150 | ○ | ○ | ○ | ○ | ○ |
| Invention example | 20 | a | 150 | ◉ | ○ | ○ | ○ | ○ |
| Invention example | 21 | a | 150 | ◉ | ○ | ○ | ○ | ○ |
| Invention example | 22 | a | 150 | ◉ | ○ | ○ | ○ | ◉ |
| Invention example | 23 | a | 150 | ◉ | ◉ | ○ | ○ | ○ |
| Invention example | 24 | a | 150 | ◉ | ◉ | ○ | ○ | ○ |
| Invention example | 25 | a | 150 | ○ | ○ | ○ | ○ | ○ |
| Invention example | 26 | a | 150 | ○ | ○ | ○ | ○ | ○ |
| Invention example | 27 | a | 150 | ○ | ○ | ○ | ○ | ○ |
| Invention example | 28 | a | 150 | ○ *11 | ○ *12 | ○ | ○ | ○ |
| Invention example | 29 | a | 150 | ○ *11 | ○ *12 | ○ | ○ | ○ |
| Invention example | 30 | a | 150 | ○ | ○ | ○ | ○ | ○ |
| Invention example | 31 | a | 150 | ◉ | ◉ | ○ | ○ | ◉ *15 |
| Invention example | 32 | a | 150 | ○ | ○ | ○ | ○ | ○ |
| Invention example | 33 | b | 150 + 150 | ◉ | ◉ | ○ | ○ | ○ |
| Invention example | 34 | a | 150 | ○ | ○ | ○ | ○ | ◉ |
| Invention example | 35 | a | 150 | ○ | ○ | ○ | ○ | ◉ |
| Invention example | 36 | a | 150 | ○ | ○ | ○ | ○ | ◉ |

*1 plated steel sheet No. in Table 1
*2 vanadium compound No. in Table 2
*3 in terms of vanadium
*4 phosphoric acid compound No. in Table 3
*5 in terms of phosphorous
*6 metal oxide code in Table 4 or phosphoric acid compound No. in Table 3
*7 in terms of metal (Al, Mg, Zn)
*8 organic resin No. in Table 5
*9 treatment method code in Table 6
*10 "—" Indicates that test was not conducted
*11 evaluated after a lapse of 120 hours as an exception
*12 evaluated after a lapse of 14 days as an exception
*13 evaluated after a lapse of 240 hours
*14 evaluated after a lapse of 28 days
*15 large amounts of film adhered to draw bead mold

TABLE 7-3

| Group | No. | Plated steel sheet *1 | Vandium compound Type *2 | Amount of adhesion mg/m² *3 | Phosphoric acid compound Type *4 | Amount of adhesion mg/m² *5 | Metal component Type *6 | Amount of adhesion mg/m² *7 | Organic resin Type *8 | Amount of adhesion g/m² |
|---|---|---|---|---|---|---|---|---|---|---|
| Invention example | 37 | 1 | 1 | 20 | 1 | 20 | B | 6.6 | 2-6 | 1.5 |
| Invention example | 38 | 1 | 1 | 20 | 1 | 20 | C | 7.2 | 2-6 | 1.5 |
| Invention example | 39 | 1 | 1 | 20 | 1 | 20 | D | 7.2 | 2-6 | 1.5 |
| Invention example | 40 | 1 | 2 | 20 | 3 | 20 | 3 | 7.2 | 2-6 | 1.5 |
| Invention example | 41 | 1 | 3 | 20 | 3 | 20 | 3 | 7.2 | 2-6 | 1.5 |
| Invention example | 42 | 1 | 4 | 20 | 3 | 20 | 3 | 7.2 | 2-6 | 1.5 |
| Invention example | 43 | 2 | 1 | 20 | 3 | 20 | 3 | 7.2 | 2-6 | 1.5 |
| Invention example | 44 | 3 | 1 | 20 | 3 | 20 | 3 | 7.2 | 2-6 | 1.5 |
| Invention example | 45 | 1 | 1 | 20 | 3 | 20 | 3 | 7.2 | 2-6 | 1.5 |
| Invention example | 46 | 1 | 1 | 20 | 3 | 20 | 3 | 7.2 | 2-6 | 3 |
| Invention example | 47 | 1 | 1 | 20 | 3 | 20 | 3 | 7.2 | 2-6 | 1.5 |
| Invention example | 48 | 1 | 1 | 20 | 3 | 20 | 3 | 7.2 | 2-6 | 1.5 |
| Invention example | 49 | 1 | 1 | 20 | 3 | 20 | 3 | 7.2 | 2-1 | 1.5 |
| Invention example | 50 | 1 | 1 | 20 | 3 | 20 | 3 | 7.2 | 2-2 | 1.5 |
| Invention example | 51 | 1 | 1 | 20 | 3 | 20 | 3 | 7.2 | 2-3 | 1.5 |
| Invention example | 52 | 1 | 1 | 20 | 3 | 20 | 3 | 7.2 | 2-4 | 1.5 |

TABLE 7-3-continued

| Group | No. | *1 | Type *2 | Amount *3 | Type *4 | Amount *5 | Type *6 | Amount *7 | Type *8 | Amount g/m² |
|---|---|---|---|---|---|---|---|---|---|---|
| Invention example | 53 | 1 | 1 | 20 | 3 | 20 | 3 | 7.2 | 2-5 | 1.5 |
| Invention example | 54 | 1 | 1 | 20 | 3 | 20 | 3 | 7.2 | 2-7 | 1.5 |
| Invention example | 55 | 1 | 1 | 20 | 3 | 20 | 3 | 7.2 | 2-8 | 1.5 |
| Invention example | 56 | 1 | 1 | 20 | 3 | 20 | 3 | 7.2 | 2-9 | 1.5 |
| Invention example | 57 | 1 | 1 | 20 | 3 | 20 | 3 | 7.2 | 2-10 | 1.5 |
| Invention example | 58 | 1 | 1 | 20 | 3 | 20 | 3 | 7.2 | 2-11 | 1.5 |

| | | Treatment method | | Quality evaluation *10 | | After water resistance test | | | |
|---|---|---|---|---|---|---|---|---|---|
| Group | No. | Type *9 | Drying temperature °C. | White rust resistance *13 | Blackening resistance *14 | Coloring variation | Film adhesion | Workability | |
| Invention example | 37 | a | 150 | ○ | ○ | ○ | ○ | ⊚ | |
| Invention example | 38 | a | 150 | ⊚ | ○ | ○ | ○ | ⊚ | |
| Invention example | 39 | a | 150 | ⊚ | ○ | ○ | ○ | ⊚ | |
| Invention example | 40 | a | 150 | ○ | ○ | ○ | ○ | ○ | |
| Invention example | 41 | a | 150 | ○ | ○ | ○ | ○ | ○ | |
| Invention example | 42 | a | 150 | ○ | ○ | ○ | ○ | ○ | |
| Invention example | 43 | a | 150 | ○ *11 | ○ *12 | ○ | ○ | ○ | |
| Invention example | 44 | a | 150 | ○ *11 | ○ *12 | ○ | ○ | ○ | |
| Invention example | 45 | a | 150 | ○ | ○ | ○ | ○ | ○ | |
| Invention example | 46 | a | 150 | ⊚ | ⊚ | ○ | ○ | ⊚ | |
| Invention example | 47 | a | 150 | ○ | ○ | ○ | ○ | ○ | |
| Invention example | 48 | b | 150 + 150 | ⊚ | ⊚ | ○ | ○ | ○ | |
| Invention example | 49 | a | 150 | ⊚ | ⊚ | ○ | ○ | ⊚ | |
| Invention example | 50 | a | 150 | ⊚ | ⊚ | ○ | ○ | ⊚ | |
| Invention example | 51 | a | 150 | ⊚ | ⊚ | ○ | ○ | ⊚ | |
| Invention example | 52 | a | 150 | ⊚ | ⊚ | ○ | ○ | ⊚ | |
| Invention example | 53 | a | 150 | ⊚ | ⊚ | ○ | ○ | ⊚ | |
| Invention example | 54 | a | 150 | ⊚ | ⊚ | ○ | ○ | ○ | |
| Invention example | 55 | a | 150 | ⊚ | ⊚ | ○ | ○ | ○ | |
| Invention example | 56 | a | 150 | ⊚ | ⊚ | ○ | ○ | ○ | |
| Invention example | 57 | a | 150 | ⊚ | ⊚ | ○ | ○ | ○ | |
| Invention example | 58 | a | 150 | ⊚ | ⊚ | ○ | ○ | ○ | |

*1 plated steel sheet No. in Table 1
*2 vanadium compound No. in Table 2
*3 in terms of vanadium
*4 phosphoric acid compound No. in Table 3
*5 in terms of phosphorous
*6 metal oxide code in Table 4 or phosphoric acid compound No. in Table 3
*7 in terms of metal (Al, Mg, Zn)
*8 organic resin No. in Table 5
*9 treatment method code in Table 6
*10 "—" indicates that test was not conducted
*11 evaluated after a lapse of 120 hours as an exception
*12 evaluated after a lapse of 14 days as an exception
*13 evaluated after a lapse of 240 hours
*14 evaluated after a lapse of 28 days
*15 large amounts of film adhered to draw bead mold

TABLE 7-4

| | | Plated steel sheet *1 | Vandium compound | | Phosphoric acid compound | | Metal component | | Organic resin | |
|---|---|---|---|---|---|---|---|---|---|---|
| Group | No. | | Type *2 | Amount of adhesion mg/m² *3 | Type *4 | Amount of adhesion mg/m² *5 | Type *6 | Amount of adhesion mg/m² *7 | Type *8 | Amount of adhesion g/m² |
| Comparative example | 15 | 1 | 1 | 20 | — | 0 | — | 0 | 1 | 1.5 |
| Comparative example | 16 | 1 | 1 | 20 | 1 | 20 | — | 0 | 1 | 1.5 |
| Comparative example | 17 | 1 | 1 | 20 | 2 | 20 | — | 0 | 1 | 1.5 |
| Comparative example | 18 | 1 | 1 | 20 | 6 | 20 | 6 | 11.4 | 1 | 1.5 |
| Comparative example | 19 | 1 | 1 | 20 | 7 | 20 | 7 | 11.4 | 1 | 1.5 |
| Comparative example | 20 | 1 | 1 | 20 | 8 | 20 | 8 | 11.4 | 1 | 1.5 |
| Comparative example | 21 | 1 | 5 | 20 | 3 | 20 | 3 | 7.2 | 1 | 1.5 |
| Comparative example | 22 | 1 | 6 | 20 | 3 | 20 | 3 | 7.2 | 1 | 1.5 |
| Comparative example | 23 | 1 | 7 | 20 | 3 | 20 | 3 | 7.2 | 1 | 1.5 |
| Comparative example | 24 | 1 | 8 | 20 | 3 | 20 | 3 | 7.2 | 1 | 1.5 |
| Comparative example | 25 | 1 | 9 | 20 | 3 | 20 | 3 | 7.2 | 1 | 1.5 |
| Comparative example | 26 | 1 | 10 | 20 | 3 | 20 | 3 | 7.2 | 1 | 1.5 |
| Comparative example | 27 | 1 | — | 0 | 3 | 20 | 3 | 7.2 | 1 | 1.5 |
| Comparative example | 28 | 1 | 1 | 200 | 3 | 20 | 3 | 7.2 | 1 | 1.5 |

TABLE 7-4-continued

| Group | No. | *1 | *2 | *3 | *4 | *5 | *6 | *7 | *8 | |
|---|---|---|---|---|---|---|---|---|---|---|
| Comparative example | 29 | 1 | 1 | 20 | 3 | 20 | 3 | 7.2 | 1 | 0.3 |
| Comparative example | 30 | 1 | 1 | 20 | 3 | 20 | 3 | 7.2 | 1 | 8 |
| Comparative example | 31 | 1 | 1 | 20 | — | 0 | — | 0 | 2-6 | 1.5 |
| Comparative example | 32 | 1 | 1 | 20 | 1 | 20 | — | 0 | 2-6 | 1.5 |
| Comparative example | 33 | 1 | 1 | 20 | 2 | 20 | — | 0 | 2-6 | 1.5 |
| Comparative example | 34 | 1 | 1 | 20 | 6 | 20 | 6 | 11.4 | 2-6 | 1.5 |
| Comparative example | 35 | 1 | 1 | 20 | 7 | 20 | 7 | 11.4 | 2-6 | 1.5 |
| Comparative example | 36 | 1 | 1 | 20 | 8 | 20 | 8 | 11.4 | 2-6 | 1.5 |
| Comparative example | 37 | 1 | 5 | 20 | 3 | 20 | 3 | 7.2 | 2-6 | 1.5 |
| Comparative example | 38 | 1 | 6 | 20 | 3 | 20 | 3 | 7.2 | 2-6 | 1.5 |
| Comparative example | 39 | 1 | 7 | 20 | 3 | 20 | 3 | 7.2 | 2-6 | 1.5 |
| Comparative example | 40 | 1 | 8 | 20 | 3 | 20 | 3 | 7.2 | 2-6 | 1.5 |
| Comparative example | 41 | 1 | 9 | 20 | 3 | 20 | 3 | 7.2 | 2-6 | 1.5 |
| Comparative example | 42 | 1 | 10 | 20 | 3 | 20 | 3 | 7.2 | 2-6 | 1.5 |
| Comparative example | 43 | 1 | — | 0 | 3 | 20 | 3 | 7.2 | 2-6 | 1.5 |
| Comparative example | 44 | 1 | 1 | 200 | 3 | 20 | 3 | 7.2 | 2-6 | 1.5 |
| Comparative example | 45 | 1 | 1 | 20 | 3 | 20 | 3 | 7.2 | 2-6 | 0.3 |
| Comparative example | 46 | 1 | 1 | 20 | 3 | 20 | 3 | 7.2 | 2-6 | 8 |

| | | Treatment method | | Quality evaluation *10 | | | |
|---|---|---|---|---|---|---|---|
| | | | | | | After water resistance test | Workability |
| Group | No. | Type *9 | Drying temperature □ | White rust resistance *13 | Blackening resistance *14 | Coloring variation | Film adhesion |
| Comparative example | 15 | a | 150 | X | X | □ | ○ | ○ |
| Comparative example | 16 | a | 150 | □ | ○ | □ | X | ○ |
| Comparative example | 17 | a | 150 | □ | □ | □ | X | ○ |
| Comparative example | 18 | a | 150 | ○ | ○ | □ | ○ | ○ |
| Comparative example | 19 | a | 150 | □ | ○ | □ | ○ | ○ |
| Comparative example | 20 | a | 150 | □ | ○ | □ | ○ | ○ |
| Comparative example | 21 | a | 150 | □ | ○ | X | ○ | — |
| Comparative example | 22 | a | 150 | □ | ○ | X | ○ | — |
| Comparative example | 23 | a | 150 | □ | ○ | X | ○ | — |
| Comparative example | 24 | a | 150 | □ | □ | — | — | — |
| Comparative example | 25 | a | 150 | □ | □ | — | — | — |
| Comparative example | 26 | a | 150 | □ | □ | — | — | — |
| Comparative example | 27 | a | 150 | X | X | — | — | — |
| Comparative example | 28 | a | 150 | □ | □ | — | — | — |
| Comparative example | 29 | a | 150 | ○ | □ | ○ | ○ | X |
| Comparative example | 30 | a | 150 | ○ | □ | ○ | ○ | □ |
| Comparative example | 31 | a | 150 | X | X | □ | ○ | □ |
| Comparative example | 32 | a | 150 | □ | ○ | □ | X | □ |
| Comparative example | 33 | a | 150 | □ | □ | □ | X | □ |
| Comparative example | 34 | a | 150 | ○ | ○ | ○ | ○ | □ |
| Comparative example | 35 | a | 150 | □ | ○ | □ | ○ | □ |
| Comparative example | 36 | a | 150 | □ | ○ | □ | ○ | □ |
| Comparative example | 37 | a | 150 | □ | ○ | X | ○ | — |
| Comparative example | 38 | a | 150 | □ | ○ | X | ○ | — |
| Comparative example | 39 | a | 150 | □ | ○ | X | ○ | — |
| Comparative example | 40 | a | 150 | □ | □ | — | — | — |
| Comparative example | 41 | a | 150 | □ | □ | — | — | — |
| Comparative example | 42 | a | 150 | □ | □ | — | — | — |
| Comparative example | 43 | a | 150 | X | X | — | — | — |
| Comparative example | 44 | a | 150 | □ | □ | — | — | — |
| Comparative example | 45 | a | 150 | ○ | □ | ○ | ○ | X |
| Comparative example | 46 | a | 150 | ○ | □ | ○ | ○ | □ *15 |

*1 plated steel sheet No. in Table 1
*2 vanadium compound No. in Table 2
*3 in terms of vanadium
*4 phosphoric acid compound No. in Table 3
*5 in terms of phosphorous
*6 metal oxide code in Table 4 or phosphoric acid compound No. in Table 3
*7 in terms of metal (Al, Mg, Zn)
*8 organic resin No. in Table 5
*9 treatment method code in Table 6
*10 "—" indicates that test was not conducted
*13 evaluated after a lapse of 240 hours
*14 evaluated after a lapse of 28 days
*15 large amounts of film adhered to draw bead mold

INDUSTRIAL APPLICABILITY

The surface treated steel sheet exhibits excellent corrosion resistance and excellent surface appearance without containing substances, such as chromium, harmful to the human body and the environment in the surface treatment film. Therefore, the manufacturing process thereof can be made pollution-free. In addition, the resulting surface treated steel sheet is an environment-conscious surface treated steel sheet, and can be widely used for automobiles, household electrical appliances, construction materials, and the like.

The invention claimed is:

1. A surface treated steel sheet comprising:
   a steel sheet;
   a plating layer containing at least one metal selected from the group consisting of zinc and aluminum on at least one surface of the steel sheet; and
   a chromium-free film on the plating layer, the film containing 1) at least one metal selected from the group consisting of Al, Mg, and Zn, 2) a vanadium compound at least most of which is tetravalent by mass, and 3) a phosphoric acid group.

2. The surface treated steel sheet according to claim 1, wherein the amount of adhesion of the tetravalent vanadium compound per one surface is about 1 to about 200 mg/m$^2$ in terms of vanadium.

3. The surface treated steel sheet according to claim 1, wherein the amount of adhesion of phosphoric acid group per one surface is about 5 to about 800 mg/m$^2$ in terms of phosphorous.

4. The surface treated steel sheet according to claim 1, wherein the thickness of the film is about 5 μm or less.

5. The surface treated steel sheet according to claim 1, wherein the film further contains an organic resin.

6. The surface treated steel sheet according to claim 5, wherein the amount of adhesion of the organic resin per one surface is about 0.5 to about 5 g/m$^2$.

7. The surface treated steel sheet according to claim 5, wherein the organic resin is at least one resin selected from the group consisting of water-soluble organic resins and water-dispersible organic resins.

8. The surface treated steel sheet according to claim 5, wherein the organic resin is a copolymer resin of styrene (a), (meth)acrylic acid (b), a (meth)acrylic ester (c) including an alkyl chain having the carbon number of 1 to 6, and an olefin (d) capable of copolymerizing with these components (a) to (c).

9. The surface treated steel sheet according to claim 8, wherein the organic resin has a solid content of styrene (a) of 20 to 60 percent by mass, a solid content of (meth)acrylic acid (b) of about 0.5 to about 10 percent by mass, and a solid content of (meth)acrylic ester (c) including an alkyl chain having the carbon number of 1 to 6 of about 20 to about 60 percent by mass relative to 100 percent by mass of solid content of the copolymer resin.

10. The surface treated steel sheet according to claim 1, further comprising an organic resin coating layer having a thickness of about 0.01 to about 5 μm on the surface of the film.

11. The surface treated steel sheet according to claim 1, comprising the surface treatment film in which the amount of adhesion of the organic resin per one surface is about 0.5 to about 5 g/m$^2$.

12. The surface treated steel sheet according to claim 10, wherein the organic resin is at least one resin selected from the group consisting of water-soluble organic resins and water-dispersible organic resins.

13. The surface treated steel sheet according to claim 10, wherein the organic resin is a copolymer resin of styrene (a), (meth)acrylic acid (b), a (meth)acrylic ester (c) including an alkyl chain having the carbon number of 1 to 6, and an olefin (d) capable of copolymerizing with these components (a) to (c).

14. The surface treated steel sheet according to claim 13, wherein the organic resin has a solid content of styrene (a) of about 20 to about 60 percent by mass, a solid content of (meth)acrylic acid (b) of about 0.5 to about 10 percent by mass, and a solid content of (meth)acrylic ester (c) including an alkyl chain having the carbon number of 1 to 6 of about 20 to about 60 percent by mass relative to 100 percent by mass of solid content of the copolymer resin.

15. The surface treated steel sheet according to claim 1, wherein the plating is an alloy plating of zinc and aluminum, containing about 25 to about 75 percent by mass of aluminum.

16. A surface treated steel sheet exhibiting excellent corrosion resistance and film appearance comprising:
    a steel sheet;
    a plating layer on a surface of the steel sheet comprising at least one type selected from the group consisting of a zinc based type, an aluminum based type, and an Al—Zn based type; and
    a chromium-free surface treatment film containing i) a vanadium compound at least most of which has, by mass, a valence of four, ii) a phosphoric compound, and iii) a compound of at least one metal selected from the group consisting of Al, Mg, and Zn disposed on the plating layer.

* * * * *

UNITED STATES PATENT AND TRADEMARK OFFICE
CERTIFICATE OF CORRECTION

PATENT NO.      : 7,842,400 B2
APPLICATION NO. : 10/565362
DATED           : November 30, 2010
INVENTOR(S)     : Yamaji et al.

It is certified that error appears in the above-identified patent and that said Letters Patent is hereby corrected as shown below:

In Column 20

At Table 7-2, at the subheading "Type *8", at no. 18, please change "4" to "1".

Signed and Sealed this
Thirty-first Day of May, 2011

David J. Kappos
*Director of the United States Patent and Trademark Office*